(12) United States Patent
Fulayter et al.

(10) Patent No.: US 10,072,511 B2
(45) Date of Patent: Sep. 11, 2018

(54) ENGINE NACELLE

(71) Applicants: Rolls-Royce Corporation, Indianapolis, IN (US); Rolls-Royce North American Technologies, Inc., Indianapolis, IN (US)

(72) Inventors: Roy D. Fulayter, Avon, IN (US); Crawford F. Smith, Carmel, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 179 days.

(21) Appl. No.: 14/839,315

(22) Filed: Aug. 28, 2015

(65) Prior Publication Data

US 2016/0097290 A1 Apr. 7, 2016

Related U.S. Application Data

(60) Provisional application No. 62/058,876, filed on Oct. 2, 2014.

(51) Int. Cl.
| | |
|---|---|
| *F01D 9/00* | (2006.01) |
| *B64C 23/06* | (2006.01) |
| *B64D 33/02* | (2006.01) |
| *B64D 29/06* | (2006.01) |
| *F01D 25/24* | (2006.01) |

(52) U.S. Cl.
CPC ............... *F01D 9/00* (2013.01); *B64C 23/06* (2013.01); *B64D 29/06* (2013.01); *B64D 33/02* (2013.01); *F01D 25/24* (2013.01); *B64D 2033/0226* (2013.01); *F05D 2220/323* (2013.01); *F05D 2240/127* (2013.01); *Y02T 50/162* (2013.01)

(58) Field of Classification Search
CPC ...... F01D 9/02; F01D 5/145; F05D 2240/127; B64D 29/06; B64D 33/02; B64C 23/06
See application file for complete search history.

(56) References Cited

U.S. PATENT DOCUMENTS

| | | |
|---|---|---|
| 2,694,357 A | 11/1954 | Lee |
| 3,664,612 A | 5/1972 | Skidmore et al. |
| 3,702,121 A | 11/1972 | Millman |
| 3,770,228 A | 11/1973 | Traksel et al. |
| 4,749,150 A | 6/1988 | Rose et al. |
| 5,156,362 A | 10/1992 | Leon et al. |
| 5,447,283 A | 9/1995 | Tindell |

(Continued)

FOREIGN PATENT DOCUMENTS

| | | |
|---|---|---|
| DE | 19634296 A1 | 4/1997 |
| EP | 0216384 A2 | 4/1987 |

(Continued)

OTHER PUBLICATIONS

DE 19634296, Ufer Erich Apr. 24, 1997.*

(Continued)

*Primary Examiner* — Woody Lee, Jr.
*Assistant Examiner* — Maxime Adjagbe
(74) *Attorney, Agent, or Firm* — Barnes & Thornburg LLP

(57) ABSTRACT

A nacelle for a gas turbine jet engine for an aircraft includes flow disruptors to provide boundary layer turbulence when the engine is exposed to air flow that is obtuse to direction of travel of the engine.

6 Claims, 2 Drawing Sheets

(56) References Cited

U.S. PATENT DOCUMENTS

| | | |
|---|---|---|
| 6,179,251 B1 | 1/2001 | Tindell et al. |
| 6,431,498 B1 * | 8/2002 | Watts .................. B64C 3/10 244/198 |
| 7,870,721 B2 | 1/2011 | Winter et al. |
| 8,186,942 B2 | 5/2012 | Haas |
| 8,192,147 B2 | 6/2012 | Haas |
| 8,282,037 B2 | 10/2012 | Jain |
| 8,348,199 B2 | 1/2013 | Sheaf et al. |
| 8,402,739 B2 | 3/2013 | Jain et al. |
| 8,408,491 B2 | 4/2013 | Jain et al. |
| 8,434,724 B2 | 5/2013 | Chelin et al. |
| 8,529,188 B2 | 9/2013 | Winter |
| 8,596,573 B2 | 12/2013 | Jain |
| 2005/0178924 A1 | 8/2005 | Bertolotti |
| 2010/0126798 A1 | 5/2010 | Lalane et al. |
| 2011/0103969 A1 | 5/2011 | Sheaf et al. |
| 2012/0097260 A1 * | 4/2012 | Porte .................. B64D 29/06 137/15.1 |

FOREIGN PATENT DOCUMENTS

| | | |
|---|---|---|
| EP | 1495963 A2 | 1/2005 |
| WO | 2009085843 A2 | 7/2009 |

OTHER PUBLICATIONS

Extended European Search Report, European Application No. 15183778.8-1754, dated Feb. 17, 2016, 8 pages.

Gorton, Susan Althoff et al., Active Flow Control on a Boundary-Layer-Ingesting Inlet, American Institute of Aeronautics and Astronautics, Jan. 2004, pp. 1-12.

Office Action from the European Patent Office for application 15183778.8-1010 dated May 22, 2018 (4 pages).

* cited by examiner

ENGINE NACELLE

CROSS REFERENCE TO RELATED APPLICATIONS

This application claims priority to and the benefit of U.S. Provisional Patent Application No. 62/058,876, filed 2 Oct. 2014, the disclosure of which is now expressly incorporated herein by reference.

FIELD OF THE DISCLOSURE

The present disclosure relates generally to a housing for a gas turbine engine for aircraft, and more specifically to a housing for a gas turbine engine for aircraft that includes passive nacelle inlet lip boundary layer energization.

BACKGROUND

Gas turbine engines are used to power aircraft. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

At cruising speed, the flow of air to the engine passes through an opening in the engine nacelle to engine intake. The engine intake generally has a fan with a number of blades that rotate to work the air. Air flow, such as cross-wind, for example, that travels in a direction obtuse from the line of flight of the engine may result in laminar separation as the flow passes over portions of the nacelle. This laminar separation tends to create a pressure gradient within the air flow to the fan, causing variations in pressure along the fan blade.

SUMMARY

The present disclosure may comprise one or more of the following features and combinations thereof.

A nacelle for a jet engine may include an inner surface defining an opening for air to flow to an engine intake, an outer surface positioned external to the surface, and a leading surface circumscribing the opening, the leading surface connecting the inner surface and the outer surface. The leading surface may define a line of stagnation and be formed to include a plurality of vortex generators positioned on leading surface along the line of stagnation.

In some embodiments, the vortex generators comprise concavities formed in the leading surface, the concavities aligned along the line of stagnation.

In some embodiments, the vortex generators comprise convex surfaces formed on the leading surface, the convex surfaces aligned along the line of stagnation.

In some embodiments, the vortex generators comprise a plurality of tabs extending from the leading surface, the tabs oriented to disrupt air flow flowing laterally across the leading surface. The tabs may include a body and at least one leading edge that is perpendicular to the line of stagnation. In some embodiments, the tabs may include a body and a plurality of leading edges that are generally perpendicular to the line of stagnation.

In some embodiments, the vortex generators comprise a plurality of fasteners positioned along the line of stagnation. The fasteners may have a generally convex shape. The fasteners may have at least one indentation formed in the generally convex shape.

A housing for a turbine engine may include an opening directing a flow of air to the engine intake, the flow of air being generally parallel to the engine's axis of rotation, an outer surface, and a plurality of forward invisible vortex generators positioned on the outer surface. The vortex generators may be positioned to disrupt a flow of air that has a direction that is perpendicular to the engine's axis of rotation.

In some embodiments, the vortex generators may include concavities formed in the leading surface, the concavities aligned along a line of stagnation on the outer surface.

In some embodiments, the vortex generators may include convex surfaces formed on the leading surface, the convex surfaces aligned along a line of stagnation on the outer surface.

In some embodiments, the vortex generators may include a plurality of tabs extending from the leading surface, the tabs oriented to disrupt air flow flowing laterally across the leading surface. The tabs may include a body and at least one leading edge that is perpendicular to a line of stagnation on the outer surface. In some embodiments, the tabs may include a body and a plurality of leading edges that are generally perpendicular to the line of stagnation.

In some embodiments, the vortex generators comprise a plurality of fasteners positioned along a line of stagnation on the outer surface. The fasteners may have a generally convex shape. In some embodiments, the fasteners may have at least one indentation formed in the generally convex shape.

A component for housing for a jet engine may include a leading surface, and a plurality of vortex generators positioned on the leading surface to disrupt air flow across the leading surface in a direction that is not parallel to the direction of travel of the jet engine.

In some embodiments, the vortex generators comprise a plurality of tabs extending from the leading surface.

These and other features of the present disclosure will become more apparent from the following description of the illustrative embodiments.

DETAILED DESCRIPTION OF THE DRAWINGS

Figure 1:
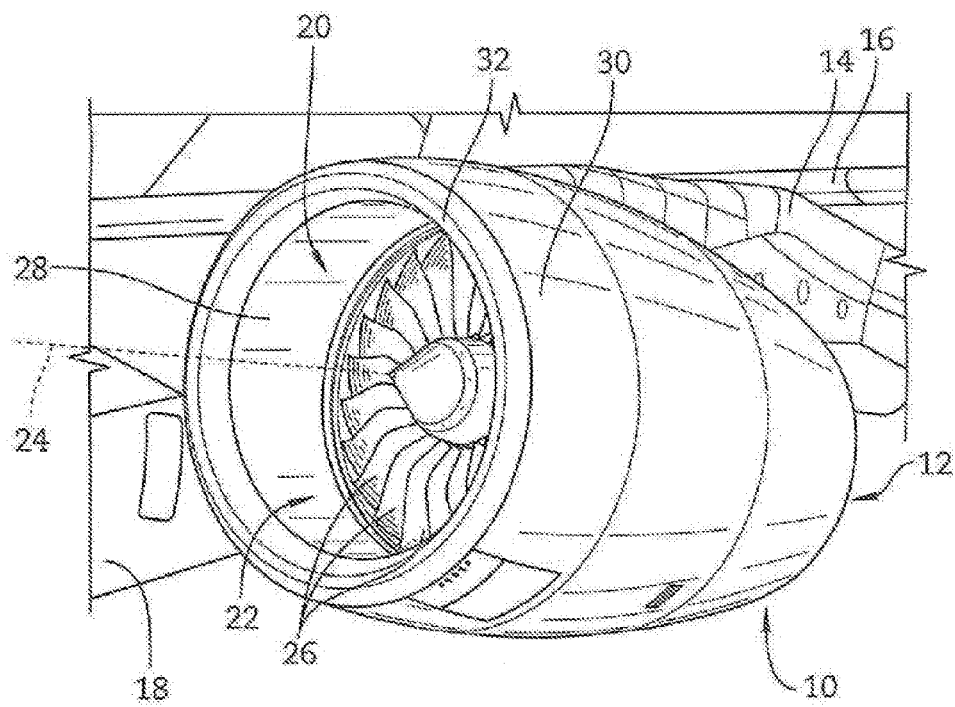
FIG. 1 is a perspective view of a portion of an aircraft, FIG. 1 showing a gas turbine engine for the aircraft, the gas turbine engine including a nacelle and being mounted to a wing of the aircraft.

For the purposes of promoting an understanding of the principles of the disclosure, reference will now be made to a number of illustrative embodiments illustrated in the drawings and specific language will be used to describe the same.

A gas turbine engine embodied as an aircraft engine 10 is mounted to the wing 16 of an aircraft 18 by a mount 14 as shown in FIG. 1. In the illustrative embodiment of FIG. 1, the engine 10 includes a housing 12. The housing 12 includes an outer surface 30, an inner surface 28, and a leading surface 32 that spans between the outer surface 30 and inner surface 28. The leading surface 32 cooperates with the inner surface 28 to define an opening 20 through which air flows into an engine intake 22. The air flowing to the engine intake 22 is initially drawn by a plurality of fan blades 26 which pull the air into the engine 10. After the aircraft 18 begins to move, air flows to the engine intake 22 as a result of both the movement of the aircraft 18 and the fan blades 26 drawing air into the opening 20. The engine 10 has an axis of rotation 24 about which the components of the engine 10 rotate during operation of the engine 10.

Figure 2:
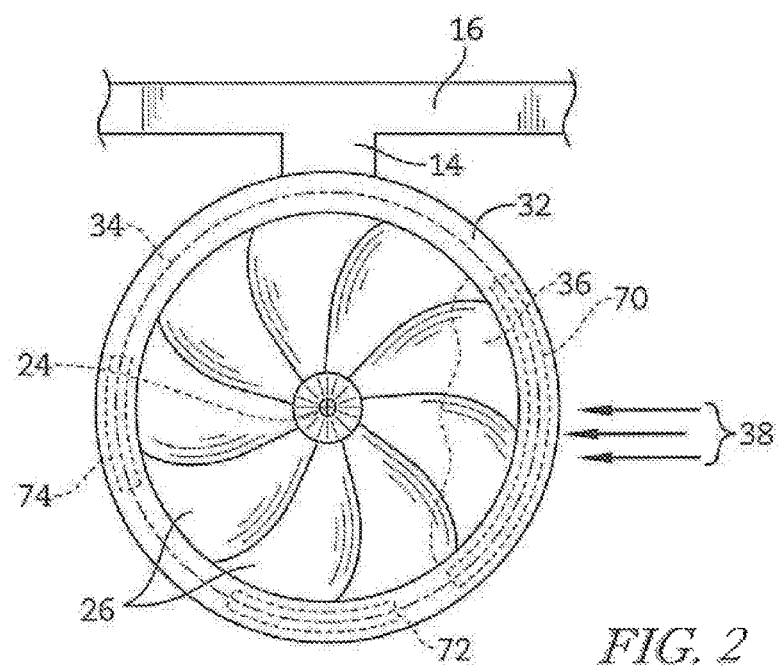
FIG. 2 is a diagrammatic view of the front of an embodiment of a gas turbine engine for an aircraft, the gas turbine engine mounted to the wing of the aircraft.
Figure 3:
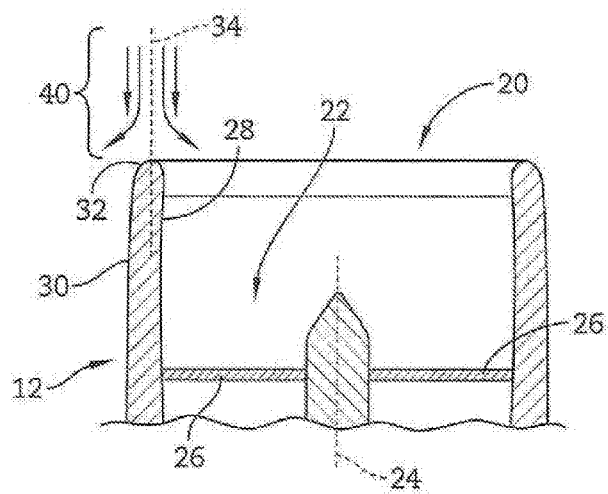
FIG. 3 is a cross-sectional view of the engine of FIG. 2, FIG. 3 showing the flow of air against a portion of the nacelle while the aircraft is at cruising speed.
Figure 4:
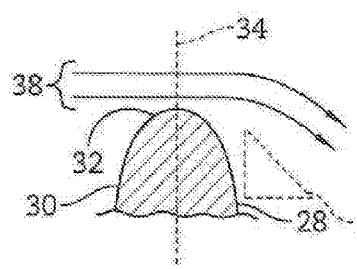
FIG. 4 is a cross-sectional view of a portion of the nacelle of the engine of FIG. 2, FIG. 4 showing the effect of cross-wind flow over the portion of the nacelle.

Referring now to FIGS. 2-4, in operation and during flight of the aircraft 18, air flow 40 impinges upon the leading surface 32 and is directed either along the leading surface 32 to flow over the outer surface 30 or over the inner surface 28 to the engine intake 22. However, stagnation develops in the flow at the point where the flow is perpendicular to the leading surface 32. This occurs at the tangent point of the leading surface 32 and is depicted in the figures as a line of stagnation 34.

Referring to FIG. 2, the present disclosure addresses a condition that occurs when a cross-wind 38 is present during operation of the engine 10 during ground operation. The cross-wind 38 flows over the leading surface 32 and due to high acceleration laminar separation occurs, creating an area of reduced pressure 36 as shown in FIG. 4. During this condition, the area of reduced pressure 36 results in a pressure gradient over the length of the fan blades 26. This pressure gradient causes vibration in the fan blades 26 as they rotate about the axis of rotation 24, subjecting the fan blades 26 to fatigue. As depicted in FIG. 3, the flow 40 into the opening, absent any cross-wind 38, is generally uniform. Referring to FIG. 4, the cross-wind 38 interacts with the incoming flow 40 and the flow over the leading surface 32 results in laminar separation at the boundary layer 44 and thereby causes the area of reduced pressure 36.

Figure 5:
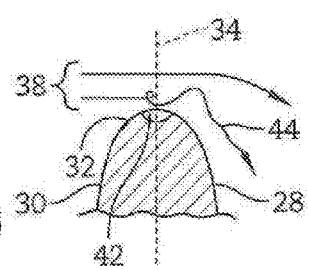
FIG. 5 is a cross-sectional view similar to FIG. 4, the nacelle of FIG. 5 including a concave surface feature for disrupting the cross-wind flow over the portion of nacelle shown.

As shown in FIG. 5, a disruption in the leading surface 32 caused by a concave surface feature 42 may generate a vortex to perturb the flow of the boundary layer 44 of the cross-wind 38 to maintain the boundary layer 44 fully turbulent. The turbulence of the boundary layer 44 is maximized and the laminar separation is reduced, thereby reducing the pressure differential in the area of reduced pressure 36, reducing the pressure gradient experienced by the fan blades 26. As indicated in FIG. 5, the concave surface feature 42 is positioned so that it is centered on the line of stagnation 34. This location reduces the aerodynamic impact at cruising speed because the concave surface feature 42 minimally changes the flowfield at cruise when located on the stagnation line 34.

Figure 6:
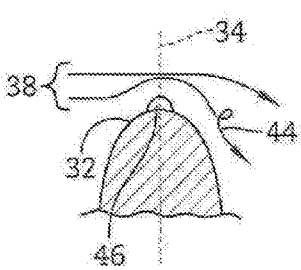
FIG. 6 is a cross-sectional view similar to FIG. 4, the nacelle of FIG. 6 including a convex surface feature for disrupting the cross-wind flow over the portion of nacelle shown.

In another embodiment shown in FIG. 6, the disruption in the leading surface 32 is caused by a convex surface feature 46 which acts as a vortex generator. The convex surface feature 46 is also positioned on the line of stagnation 34. As depicted in FIG. 6, the convex surface feature 46 also causes turbulence in the boundary layer 44, reducing the laminar separation and pressure gradient experienced by the fan blades 26.

Figure 7:
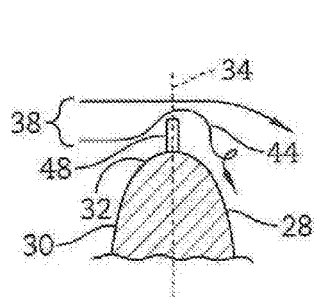
FIG. 7 is a cross-sectional view similar to FIG. 4, the nacelle of FIG. 7 including a tab extending from the nacelle, the tab configured for disrupting the cross-wind flow over the portion of nacelle shown.
Figure 8:
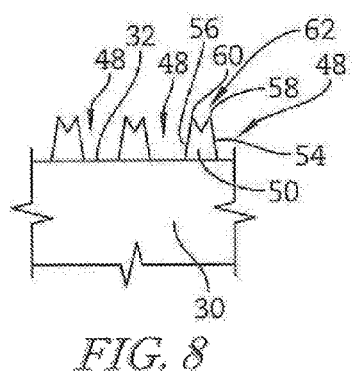
FIG. 8 is a side view of the engine nacelle of FIG. 7, FIG. 8 showing the shape of the tab which includes two leading edges.

In still yet another embodiment shown in FIG. 7, a tab 48 is positioned on the leading surface 32, the tab 48 positioned along the line of stagnation 34. As shown in FIG. 8, the tab 48 includes a body 50 that has a base 52 and converging sides 54 and 56. The converging sides 54 and 56 each terminate in a respective leading edge 58 and 60 as shown in FIG. 8 with the tab 48 formed to include a depression 62 between each of the leading edges 58 and 60. The tabs 48 are arranged to have a minimal impact on the cruise aerodynamics, while still acting as a vortex generator providing a disruption in the leading surface 32 to induce turbulence in the boundary layer 44. In the illustrative embodiment, the leading edges 58 and 60 are positioned generally perpendicular to the line of stagnation 34 and extend radially from the axis of rotation 24 of the engine 10.

Figure 9:
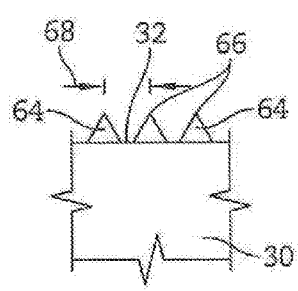
FIG. 9 is a side view similar to FIG. 8, FIG. 9 showing another embodiment of tab that extends from the nacelle, the tabs of FIG. 9 including a single leading edge.

In another embodiment shown in FIG. 9, triangular tabs 64 are placed along the line of stagnation 34 similar to the embodiment of FIGS. 7 and 8. However, in the embodiment of FIG. 9, the tabs 64 are triangularly shaped with a single leading edge 66. The leading edge 66 extends generally perpendicular to the line of stagnation 34 and aligns with a radius from the axis of rotation 24 of the engine 10. The spacing 68 of the triangular tabs 64 is such that the adjacent triangular tabs 64 cooperate to disrupt the cross-wind 38.

It should be understood that the embodiments of flow disruptors in the form of concave surface feature 42, convex surface feature 46, tab 48, and tab 64 are simply illustrative. The present disclosure is directed to various boundary layer disruptors that may be implemented to disrupt cross-wind or other cross-flows into a jet engine. For example, other surface discontinuities, such as grit blasting may be employed. The surface discontinuities described above, such as the concave surface feature 42 may be formed by causing the assembly of the components of the housing to be arranged such that a joint is formed along the line of stagnation 34 to cause flow disruptions over the leading surface 32. Additionally, the convex surface feature 46 may be embodied as a fastener, such as a rivet, for example, with multiple fasteners positioned along the line of stagnation 34. In some cases, the fastener may have a generally convex profile, but include a concave discontinuity formed in the convex profile. For example, a screw head or rivet head may have an indentation or a concave dimple formed in a convex profile.

In addition, different flow disruptors may be used with the same engine 10. For example, in the embodiment shown in FIG. 2, a first area 70, shown as enclosed by broken lines, represents an outboard side of the engine 10 and may include a first group of flow disruptors, such as the tabs 48 may be positioned along the line of stagnation 34 due to the potential for high cross-winds 38. However, the area 72 may have grit blasting applied to disrupt the leading surface 32 in the area where higher flow will occur during a high angle of attack.

Finally, the area 74 includes concave surface features 42 to disrupt flow from the inboard direction. In this way, the different areas might have different treatments to address different potential cross-flow conditions.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A nacelle for a jet engine comprising
   an inner surface defining an opening for air to flow to an engine intake,
   an outer surface positioned external to the inner surface, and
   a leading surface circumscribing the opening, the leading surface connecting the inner surface and the outer surface, the leading surface defining a line of stagnation and formed to include a plurality of vortex generators positioned on leading surface along the line of stagnation,
   wherein the vortex generators comprise a plurality of tabs extending from the leading surface, the tabs oriented to disrupt air flow flowing laterally across the leading surface,
   wherein the tabs comprise a body and a plurality of leading edges that are generally perpendicular to the line of stagnation, and
   wherein each of the tabs has converging sides that each terminate in the leading edges.

2. The nacelle of claim 1, wherein each of the tabs includes a depression between each of the leading edges.

3. A housing for a turbine engine comprising
   an opening directing a flow of air to the engine intake, the flow of air being generally parallel to the engine's axis of rotation,
   an outer surface, and
   a plurality of vortex generators, each vortex generator positioned on the outer surface at a position that is located on a stagnation line such that the vortex generator minimally changes the flowfield, the plurality of vortex generators positioned to disrupt a cross-wind flow of air that has a direction that is perpendicular to the engine's axis of rotation and reduce the pressure gradient experienced by fan blades of the engine intake,
   wherein the vortex generators comprise a plurality of tabs extending from the leading surface, the tabs oriented to disrupt air flow flowing laterally across the leading surface,
   wherein the tabs comprise a body and a plurality of leading edges that are generally perpendicular to the line of stagnation, and
   wherein each of the tabs has converging sides that each terminate in the leading edges.

4. The housing of claim 3, wherein each of the tabs includes a depression between each of the leading edges.

5. A component for housing for a jet engine comprising:
   a leading surface, and
   a plurality of vortex generators positioned on the leading surface to disrupt air flow across the leading surface in a direction that is not parallel to the direction of travel of the jet engine,
   wherein the vortex generator comprise a plurality of tabs extending from the leading surface, the tabs oriented to disrupt air flow flowing laterally across the leading surface wherein the tabs comprise a body and a plurality of leading edges that are perpendicular to a line of stagnation on the outer surface, and
   wherein each of the tabs has converging sides that each terminate in the leading edges.

6. The component of claim 5, wherein each of the tabs includes a depression between each of the leading edges.

* * * * *